(12) United States Patent
Shin et al.

(10) Patent No.: US 7,554,595 B2
(45) Date of Patent: Jun. 30, 2009

(54) MOBILE TERMINAL HAVING ROTATABLE CAMERA AND SWIVEL HINGE STRUCTURE

(75) Inventors: Sang-Hoon Shin, Gyeonggi-Do (KR); Sung-Woong Ahn, Seoul (KR); Chang-Heui Hong, Suweon (KR)

(73) Assignee: LG Electronics Inc., Seoul (KR)

( * ) Notice: Subject to any disclaimer, the term of this patent is extended or adjusted under 35 U.S.C. 154(b) by 772 days.

(21) Appl. No.: 10/993,997

(22) Filed: Nov. 19, 2004

(65) Prior Publication Data

US 2005/0110887 A1    May 26, 2005

(30) Foreign Application Priority Data

Nov. 21, 2003    (KR) .................. 10-2003-0083146

(51) Int. Cl.
*H04N 5/222* (2006.01)
*H04N 5/225* (2006.01)
(52) U.S. Cl. .................. 348/333.06; 348/375
(58) Field of Classification Search ........... 348/333.06, 348/373–376; 455/344; 379/441; 396/434
See application file for complete search history.

(56) References Cited

U.S. PATENT DOCUMENTS

| | | | | |
|---|---|---|---|---|
| 5,491,507 | A * | 2/1996 | Umezawa et al. | 348/14.02 |
| 6,466,202 | B1 * | 10/2002 | Suso et al. | 345/169 |
| 6,697,117 | B1 * | 2/2004 | Park | 348/373 |
| 6,965,413 | B2 * | 11/2005 | Wada | 348/376 |
| 6,975,273 | B1 * | 12/2005 | Choi | 343/702 |
| 7,084,919 | B2 * | 8/2006 | Shibata et al. | 348/333.06 |
| 7,146,197 | B2 * | 12/2006 | Kang et al. | 455/575.1 |
| 7,212,844 | B2 * | 5/2007 | Gordecki | 455/575.1 |
| 7,301,555 | B2 * | 11/2007 | Navntoft | 348/14.02 |
| 2003/0109232 | A1 * | 2/2003 | Park | 348/373 |
| 2003/0044001 | A1 | 3/2003 | Kim | |
| 2003/0228847 | A1 * | 12/2003 | Matsumoto | 455/90.3 |
| 2004/0198474 | A1 * | 10/2004 | Jung et al. | 455/575.1 |

FOREIGN PATENT DOCUMENTS

| | | |
|---|---|---|
| CN | 1391420 | 1/2003 |
| CN | 1426631 | 6/2003 |
| CN | 1469668 | 1/2004 |
| EP | 1 298 890 A2 | 4/2003 |
| GB | 2 387 063 A | 10/2003 |
| JP | 8321863 | 12/1996 |
| JP | 2000-253124 | 9/2000 |
| JP | 2001-136254 | 5/2001 |
| JP | 2002-111834 | 4/2002 |

(Continued)

*Primary Examiner*—Tuan V Ho
*Assistant Examiner*—Chia-Wei A Chen
(74) *Attorney, Agent, or Firm*—Lee, Hong, Degerman, Kang & Waimey

(57) ABSTRACT

A mobile communication terminal comprising a main body, a folder having a display, a first hinge formed at an upper portion of the main body for rotating the folder about the main body in a first direction, a camera positioned at a surface of the first hinge, and a second hinge formed between the folder and the first hinge for rotating the folder about the main body in a second direction. An object can be easily photographed at various angles and, even with the folder in a closed position, the object can be photographed while checking an image through the display.

17 Claims, 4 Drawing Sheets

FOREIGN PATENT DOCUMENTS

| | | |
|---|---|---|
| JP | 2002-374434 | 12/2002 |
| JP | 2003-018261 | 1/2003 |
| JP | 2003018261 A | 1/2003 |
| JP | 2003069676 | 3/2003 |
| JP | 2003-131755 | 5/2003 |
| JP | 2003-163824 | 6/2003 |
| KR | 1020020094587 A | 12/2002 |
| KR | 1020030031536 A | 4/2003 |
| WO | WO02104008 | 12/2002 |

* cited by examiner

MOBILE TERMINAL HAVING ROTATABLE CAMERA AND SWIVEL HINGE STRUCTURE

CROSS-REFERENCE TO RELATED APPLICATIONS

Pursuant to 35 U.S.C. § 119(a), this application claims the benefit of earlier filing date and right of priority to Korean Application No. 10-2003-83146, filed on Nov. 21, 2003, the contents of which are hereby incorporated by reference herein in their entirety.

BACKGROUND OF THE INVENTION

1. Field of the Invention

The present invention relates to a camera-mounted mobile terminal and, more particularly, to a mobile communication terminal having a rotatable camera and a swivel hinge structure.

2. Description of the Related Art

In line with users' increasing demands on multimedia, recently developed mobile communication terminals can reproduce high quality sound and video as well as take high quality photographs.

FIG. 1 is a perspective view of a related art camera-attached mobile communication terminal.

As shown in FIG. 1, the related art camera-attached mobile terminal includes a main body 60 having a key pad 62, a folder 64 coupled to the main body 60 through a hinge 68, and a camera 66 installed at an upper surface of the folder 64.

When a user photographs an object, the user opens the folder 64 and directs the camera 66 toward the object. In this state, the user can check an image of the object to be photographed through a display screen, such as a liquid crystal display (LCD), viewable only when the folder is open. After checking, the user may photograph the object by manipulating the key pad 62 or some other key.

Presently, various types of camera-attached terminals are shown in the market wherein camera positions are varied in consideration of photographing scenes.

However, problems exist because the related art camera-attached mobile terminals photograph an object using only one camera. Thus, taking photographs from the both the front of the terminal as well as the back of the terminal is not possible. Although third-generation (3G) terminals having two cameras exist for photographing front and rear side directions to satisfy scenes for a picture communication, such a structure disadvantageously increases the size of the terminal. Furthermore, the related art camera-attached mobile terminals must have their folders in an open position to view an image to be photographed on the display. For those users who wish to keep the folder in a closed position while taking a photograph, it is not possible for the user to check the image through the display screen.

Therefore, what is needed is a camera-attached mobile terminal utilizing only one camera that allows a user to photograph scenes from both the front and back of the terminal and check an image to be photographed on a folder-housed display screen while the folder is in a closed position.

SUMMARY OF THE INVENTION

The present invention provides a mobile communication terminal capable of performing photography at various angles with one camera. Further, the present invention provides a mobile communication terminal capable of performing photography while checking an image on a display with a folder in a closed position.

To achieve at least the above objects in whole or in parts, there is provided a mobile communication terminal comprising a main body, a folder having a display, a first hinge formed at an upper portion of the main body for rotating the folder about the main body in a first direction, a camera positioned at a surface of the first hinge, and a second hinge formed between the folder and the first hinge for rotating the folder about the main body in a second direction.

In accordance with one aspect of the invention, the camera is rotated about the main body in the first direction, wherein the first direction is perpendicular to the second direction. Also, the folder is rotatable about the main body by 180° in the second direction.

In an exemplary embodiment, the folder is rotatable about the main body in the first direction to a closed position while the folder is rotated about the main body by 180° in the second direction, wherein the camera is exposed when the folder is in the closed position. Also, the display is exposed when the folder is rotated in the first direction to the closed position and rotated by 180° in the second direction.

In accordance with another aspect of the invention, the second hinge comprises a swivel portion having a rotation hole, a rotational shaft rotatably inserted in the rotation hole and fixed to the folder, and an engaging jaw formed at the swivel portion. In one exemplary embodiment, the rotational shaft comprises a fixed portion fixed at the folder, a lower end shaft connected to the fixed portion and having a first radius, and an upper end shaft connected to the fixed portion and having a second radius greater than the first radius so as to be engaged by the engaging jaw, wherein the rotational shaft comprises a hole for allowing a data line to pass through. Moreover, the camera may comprise a handle for rotating the camera.

In accordance with a further aspect of the invention, a method for photographing an object with a camera of a mobile communication terminal, comprises forming a first hinge at an upper portion of a main body for rotating a folder about the main body in a first direction, forming a second hinge between the folder and the first hinge for rotating the folder about the main body in a second direction, and positioning a camera at a surface of the first hinge.

The method further comprises rotating the camera about the main body in the first direction, wherein the first direction is perpendicular to the second direction. The method also comprises rotating the folder about the main body by 180° in the second direction and rotating the folder about the main body in the first direction to a closed position while the folder is rotated about the main body by 180° in the second direction.

In an exemplary embodiment, the method comprises exposing the camera when the folder is in the closed position. Also, the method may expose the display when the folder is rotated in the first direction to the closed position and rotated by 180° in the second direction. The method may further comprise viewing the object to be photographed on the display when the folder is rotated in the first direction to the closed position and rotated by 180° in the second direction. Moreover, the camera comprises a handle for rotating the camera.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

It is to be understood that both the foregoing general description and the following detailed description of the present invention are exemplary and explanatory and are intended to provide further explanation of the invention as claimed.

BRIEF DESCRIPTION OF THE DRAWINGS

The invention will be described in detail with reference to the following drawings in which like reference numerals refer to like elements.

DETAILED DESCRIPTION OF THE PREFERRED EMBODIMENTS

Figure 1:
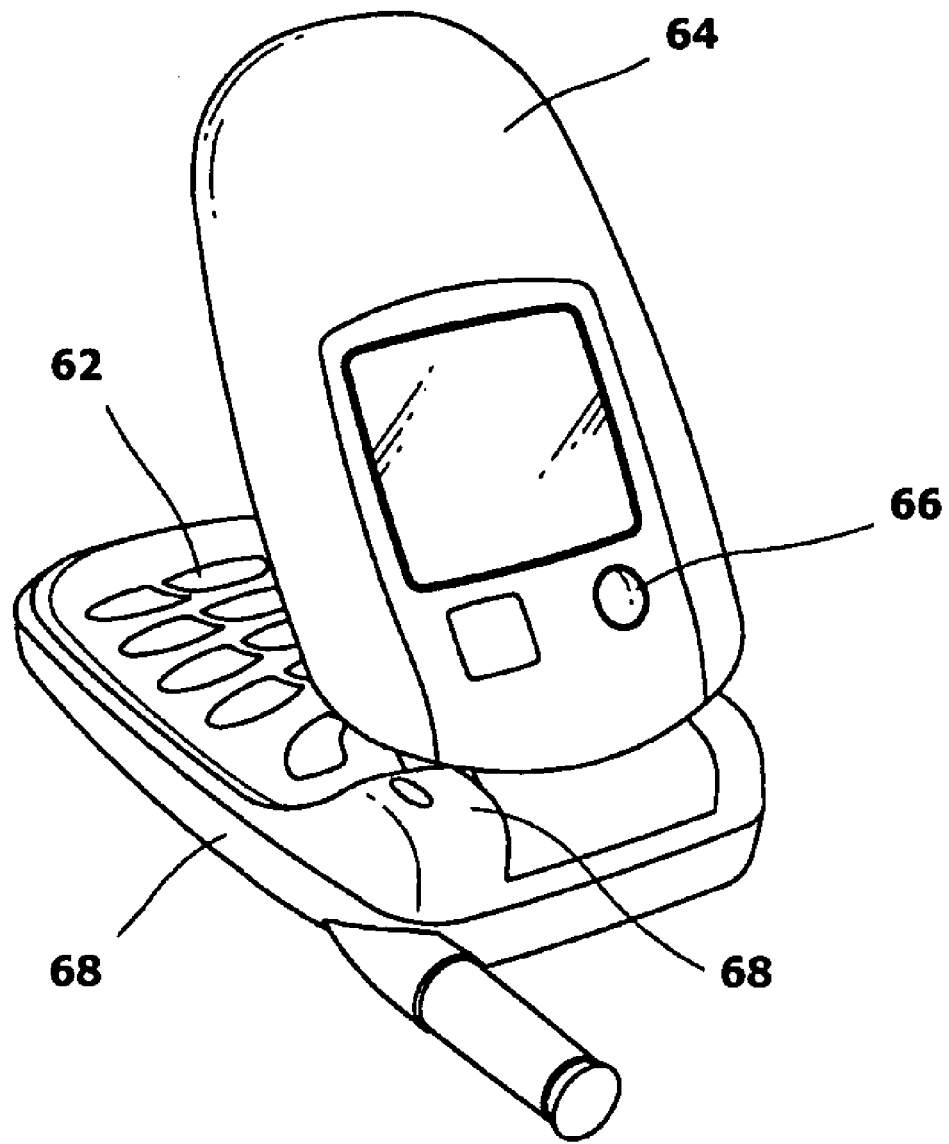
FIG. 1 is a perspective view showing a related art camera-attached mobile communication terminal.

The present invention relates to a mobile communication terminal and method for photographing an object at various angles, including front and rear directions, by using a rotatable camera. The terminal is designed such that a user can view an image of the object to be photographed through a display even when a folder housing the display is in a closed position.

The mobile communication terminal of the present invention preferably comprises a rotatable camera 32 such as a rotary type cylindrical camera installed at a central portion of a first hinge wherein the camera 32 can be rotated about a main body in a first direction. The camera 32 includes a camera lens 50 and a handle 34 for rotating the camera. A key pad 21 is installed at a front surface of a main body of the terminal. A side button 22 is also provided at a side surface of the main body. When depressed by the user, the side button 22 triggers the camera 32 to take the photograph. The mobile communication terminal preferably also comprises a second hinge for allowing a folder, which houses a display, to be rotated by an angle such as 180° about the main body in a second direction, wherein the second direction is perpendicular to the first direction.

Figure 2:
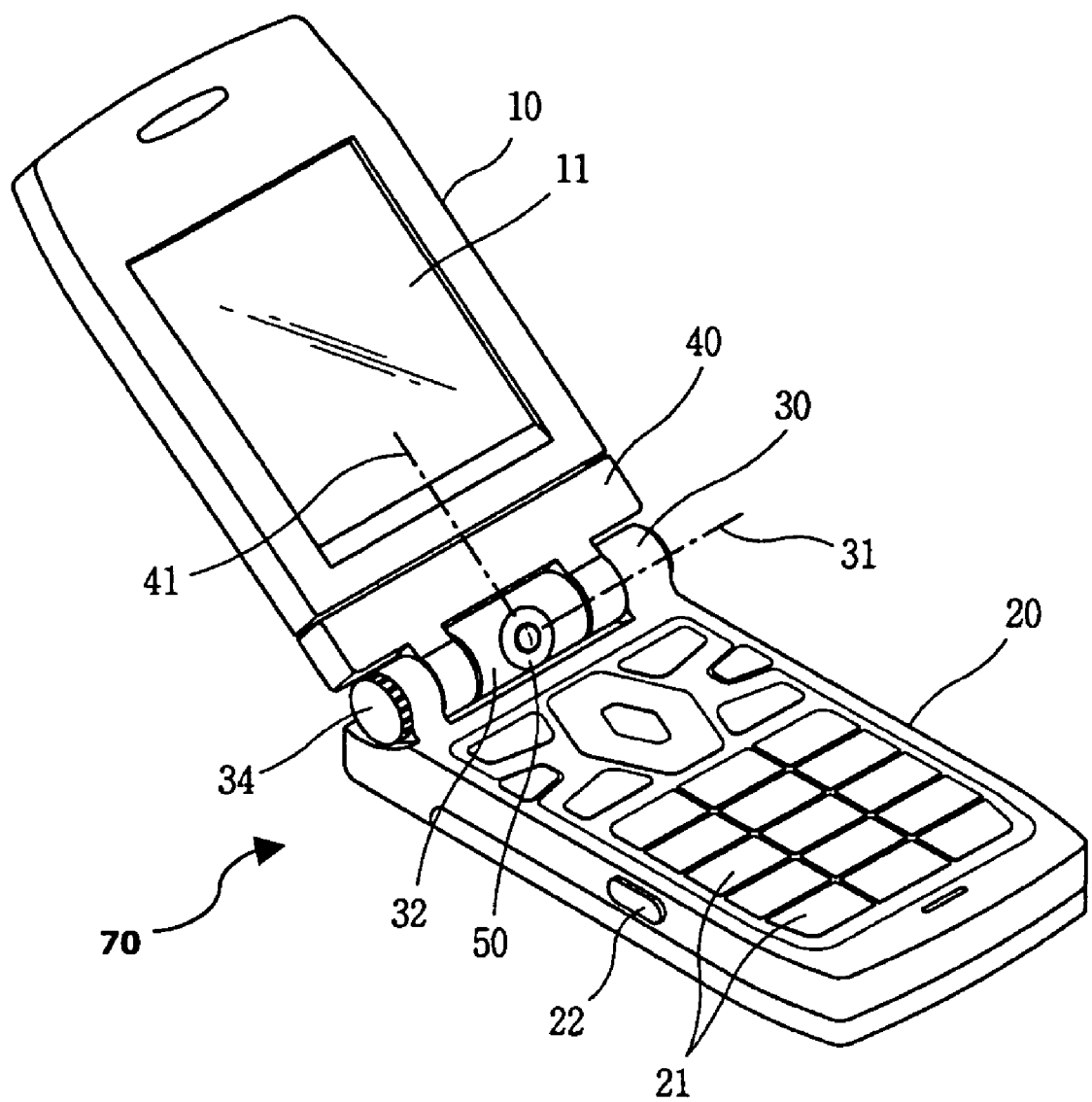
FIG. 2 is a perspective view of a mobile communication terminal having a rotatable camera and a swivel hinge structure in accordance with one embodiment of the invention.

Referring to FIG. 2, the mobile communication terminal 70 comprises a main body 20, a folder 10 having a display 11, a first hinge 30, a rotatable camera 32 positioned at a central portion of the first hinge 30, and a second hinge 40. The first hinge 30 is formed at an upper portion of the main body 20 and functions to allow the folder 10 to rotate about the main body 20 in a first direction centering on a first rotational axis 31. The second hinge 40 is formed between the folder 10 and the first hinge 30 and is coupled to each respectively such that it can also be rotated about the main body 20 in the first direction. The second hinge 40 also functions to allow the folder 10 to rotate about the main body 20 in a second direction centering on a second rotational axis 41. Preferably, the folder 10 is rotatable about the main body 20 by an angle such as 180° in the second direction.

Preferably, the second hinge 40 comprises a swivel hinge 42 having a rotation hole at its central portion and a rotational shaft rotatably inserted in the rotation hole of the swivel hinge 42 and fixed to the folder 10. The swivel hinge 42 further comprises an engaging jaw 43 for engaging the rotational shaft.

Figure 3:
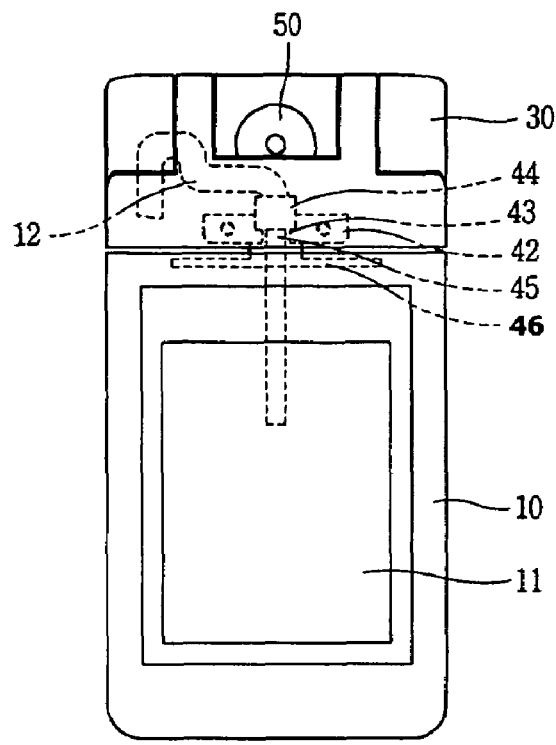
FIG. 3 is a detailed view of the swivel hinge of FIG. 2 in accordance with one embodiment of the invention.

Referring to FIG. 3, the rotational shaft comprises a fixed portion 46 fixed at the folder part 10, a lower end shaft 45 and an upper end shaft 44. The shafts 44 and 45 are connected to the fixed portion 46. Preferably, the lower end shaft 45 has a radius smaller than the radius of the upper end shaft 44 wherein the radius of the upper end shaft allows it to be engaged by the engaging jaw 43. Additionally, a hole is formed at the rotational shaft to allow a data line 12, such as a flexible printed circuit board (FPCB), to pass through.

Figure 4:
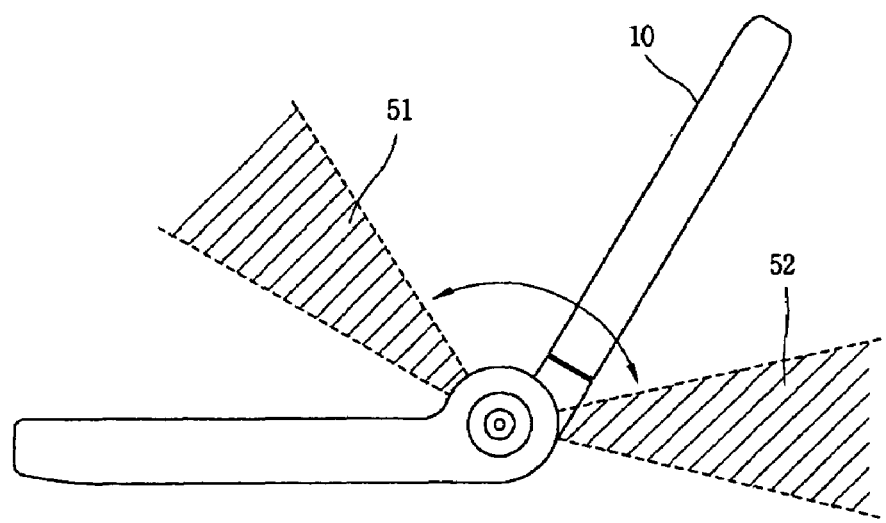
FIG. 4 is a side view of the mobile communication terminal depicting a camera field of vision with a folder in an open position in accordance with one embodiment of the invention.

With reference to FIGS. 2 to 4, during operation of the mobile communication terminal of the present invention, a user may photograph an object by using the rotatable camera 32. Preferably, the user rotates the handle 34 to direct the camera lens 50 toward the object and then manipulates the side button 22 provided at the main body 20 or a key on the keypad 21 to take the photograph. As shown in FIGS. 2 and 4, the rotatable camera 32 is mounted at the first hinge 30 such that when the folder 10 is in an open position, the camera 32 can be rotated to view objects in front of as well as in back of the terminal. Preferably, the rotatable camera 32 can be rotated about the main body 20 by an angle such as 180° centering on the first rotational axis 31. Further referring to FIG. 4, vision fields 51 and 52 are examples of what the camera 32 is capable of viewing in front of and in back of the terminal respectively. It is contemplated that the angle of the vision fields 51 and 52 will change according to the angle of the rotated camera 32. Thus, during operation of the terminal, the user can freely take a photograph of its own figure or any object within the vision field 51 and any object within the vision field 52.

Figure 5:
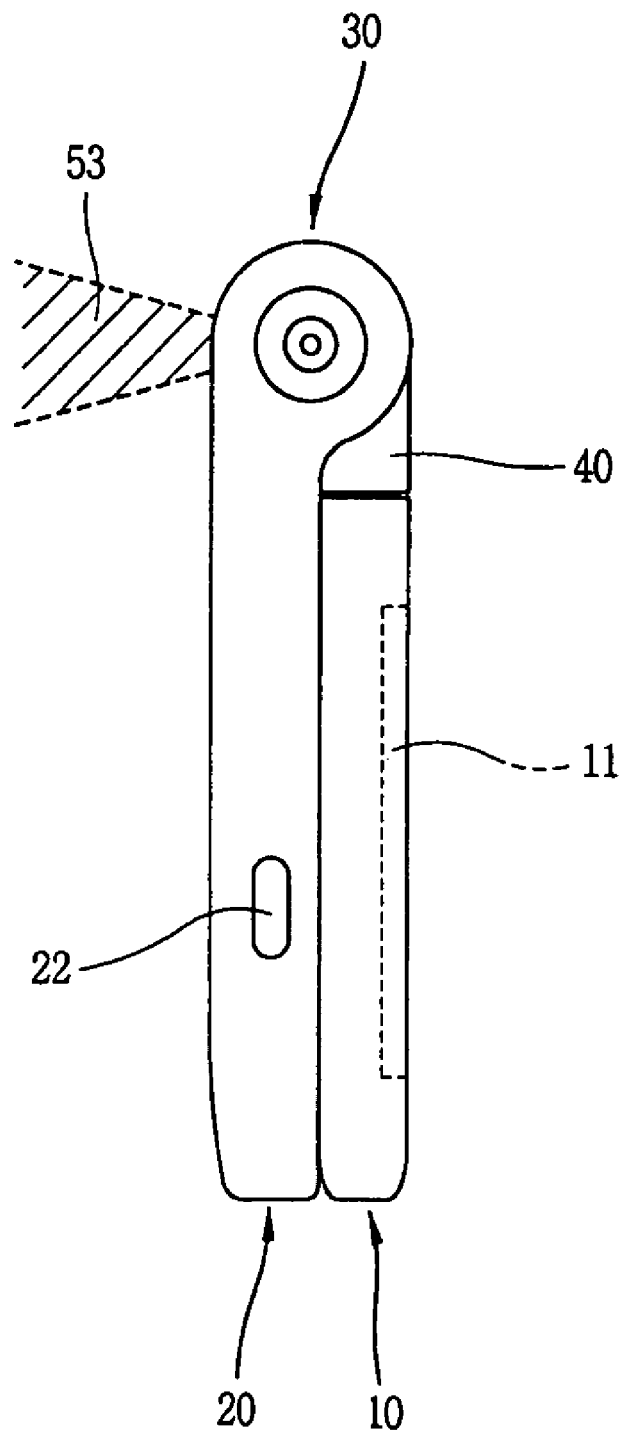
FIG. 5 is a side view of the mobile communication terminal with the folder closed for photographing an object while checking an image through a display in accordance with one embodiment of the invention.

Referring to FIG. 5, during operation of the mobile communication terminal, the user may photograph an object using the rotatable camera 32 while the folder 10 is in a closed position. Preferably, the camera 32 and the second hinge 40 are both mounted at the first hinge 30 such that the camera lens 50 of the camera 32 is left exposed when the folder 10 is in the closed position. Thus, the camera 32 can be rotated to view an object within a vision field 53, as shown in FIG. 5. When the user is ready, the side button 22 may be manipulated to take the photograph of the object. It is contemplated that the angle of the vision field 53 will change according to the angle of the rotated camera 32.

Additionally, the second hinge 40 allows the folder 10 to be rotated in a direction perpendicular to the rotation direction of the camera 32. Preferably, the folder 10 can be rotated about the main body 20 by an angle such as 180° centering on the second rotational axis 41. Thus, when the folder 10 is rotated about the main body 20 in the first direction centering on the first rotational axis 31 to close the folder, the rotated position of the folder 10 in the second direction centering on the second rotational axis 41 may be maintained. Hence, the display 11 is left exposed while the folder 10 is in a closed position. This facilitates the user taking a photograph of a desired object while checking an image of the object on the display 11 while the folder 10 is in a closed position.

As so far described, the mobile communication terminal having the rotatable camera and the swivel hinge structure has such advantages that a desired object can be easily photographed and, even with the folder closed, the object can also be photographed while checking an image on a display.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, any means-plus-function clauses are intended to cover the structure described herein as performing the recited function and not only structural equivalents but also equivalent structures.

What is claimed is:

1. A mobile communication terminal comprising:
   a main body, having an upper portion;
   a first body, having first and second end portions, the first body rotatably connected to the main body in a first direction by a first hinge formed at the upper portion of the main body, wherein a camera is mounted to the first body and the first hinge supports the first and second end portions of the first body;
   a second body having first and second end portions, rotatably connected to the first body in the first direction, such that the first and second end portions of the second body are supported by the first and second end portions of the first body; and
   a folder, having a lower portion and having a display rotatably connected to the second body in a second direction by a second hinge, wherein the second hinge is formed at the lower portion of the folder.

2. The mobile communication terminal of claim 1, wherein the first direction is perpendicular to the second direction.

3. The mobile communication terminal of claim 1, wherein the folder is rotatable about the main body by 180° in the second direction.

4. The mobile communication terminal of claim 3, wherein the folder is rotatable about the main body in the first direction to a closed position while the folder is rotated about the main body by 180° in the second direction.

5. The mobile communication terminal of claim 4, wherein the display is exposed when the folder is rotated in the first direction to the closed position and rotated by 180 in the second direction.

6. The mobile communication terminal of claim 1, wherein the second hinge comprises:
   a swivel portion having a rotation hole;
   a rotational shaft rotatably inserted in the rotation hole and fixed to the folder; and
   an engaging jaw formed at the swivel portion.

7. The mobile communication terminal of claim 6, wherein the rotational shaft comprises:
   a fixed portion fixed at the folder;
   a lower end shaft connected to the fixed portion and having a first radius; and
   an upper end shaft connected to the fixed portion and having a second radius greater than the first radius so as to be engaged by the engaging jaw.

8. The mobile communication terminal of claim 6, wherein the rotational shaft comprises a hole for allowing a data line to pass through.

9. The mobile communication terminal of claim 1 wherein the camera further comprises a handle for rotating the camera.

10. A mobile communication terminal comprising;
    a main body;
    a folder; and
    a folding mechanism operatively connecting the folder with the main body to allow the folder and the main body to be opened and closed with respect to each other, wherein the folding mechanism comprises:
    a first body, having first and second portions, the first body rotatably connected to the main body in a first direction by a first hinge formed at the an upper portion of the main body, wherein a camera is connected to the first body and the first hinge supports the first and second end portions of the first body and
    a second body having first and second end portions, rotatably connected to the first body in the first direction, such that the first and second end portions of the second body are supported by the first and second end portions of the first body;
    wherein the folder has a lower portion and a display and wherein the folder is rotatably connected to the second body in a second direction by a second hinge, the second hinge formed at the lower portion.

11. The terminal of claim 10, wherein the first direction is substantially perpendicular to the second direction.

12. The terminal of claim 10, wherein the camera further comprises a handle for rotating the camera.

13. The terminal of claim 12, further comprising:
    an electrical connector that passes through the first part of the folder and allows components in the main body and components in the second part of the folder to be electrically connected.

14. The terminal of claim 10, wherein the second hinge is spaced apart from the first hinge.

15. The terminal of claim 14, wherein the folder is operatively connected with the second body via a rotating mechanism that allows the folder and the second body to rotate with respect to each other about a rotating axis.

16. The terminal of claim 15, wherein the second body has an appropriate size to accommodate certain elements of the rotating mechanism therein.

17. The terminal of claim 15, wherein the rotating mechanism comprises:
    a shaft that operatively connects the first and second parts of the folder, the shaft having an appropriate length to sufficiently extend from the first part to the second part to act as the rotating axis and providing adequate support for at least the second part.

* * * * *